(12) United States Patent
Khafizov et al.

(10) Patent No.: US 8,713,064 B1
(45) Date of Patent: Apr. 29, 2014

(54) ATTRIBUTE CATEGORY ENHANCED SEARCH

(75) Inventors: Farid Khafizov, Plano, TX (US); Margarita Khafizova, Plano, TX (US)

(73) Assignee: Open Invention Network, LLC, Durham, NC (US)

( * ) Notice: Subject to any disclaimer, the term of this patent is extended or adjusted under 35 U.S.C. 154(b) by 129 days.

(21) Appl. No.: 13/170,260

(22) Filed: Jun. 28, 2011

Related U.S. Application Data

(60) Provisional application No. 61/359,043, filed on Jun. 28, 2010.

(51) Int. Cl.
*G06F 17/30* (2006.01)

(52) U.S. Cl.
USPC ........... 707/797; 707/708; 707/731; 707/737; 707/771; 707/778; 707/956; 715/853

(58) Field of Classification Search
USPC ......... 707/708, 731, 737, 771, 778, 797, 956, 707/805; 715/853
See application file for complete search history.

(56) References Cited

U.S. PATENT DOCUMENTS

| | | | | |
|---|---|---|---|---|
| 7,603,367 | B1 * | 10/2009 | Kanter et al. | 707/999.003 |
| 7,698,261 | B1 * | 4/2010 | Khoshnevisan | 707/999.003 |
| 7,765,227 | B1 * | 7/2010 | Khoshnevisan et al. | 707/769 |
| 8,311,845 | B2 * | 11/2012 | Vengroff et al. | 705/1.1 |
| 8,422,782 | B1 * | 4/2013 | Dhua et al. | 382/170 |
| 8,521,600 | B2 * | 8/2013 | Hodge | 705/26.81 |
| 2002/0038299 | A1 * | 3/2002 | Zernik et al. | 707/3 |
| 2002/0194074 | A1 * | 12/2002 | Jacobs | 705/16 |
| 2004/0068508 | A1 * | 4/2004 | Sihvo et al. | 707/100 |
| 2004/0083203 | A1 * | 4/2004 | Kemp | 707/3 |
| 2009/0234710 | A1 * | 9/2009 | Belgaied Hassine et al. | 705/10 |
| 2009/0271295 | A1 * | 10/2009 | Hodge | 705/27 |
| 2012/0159294 | A1 * | 6/2012 | Gonsalves et al. | 715/205 |

OTHER PUBLICATIONS

WaybackMachine, Amazon.com, retrived from webarchive.org link http://web.archive.org/web/20100114212739/http://www.amazon.com/b?ie=UTF8&node=553222, Jan. 14, 2010, 6 pages.*
Weboptimser, "Researchers develop image-based search engine", Apr. 14, 2004.
Tada, Masahiro, et al., "Similarity Image Retrieval System Using Hierarchical Classification", Springer-Verlag, Berlin, Hiedelberg, 2002.
PR Newswire, "Ereo Introduces Industry's First Image-based Search Engine that Allows Search by Pictures and Other Rich Media", PR Newswire, Nov. 13, 2000.
Netdaily.org, "VizSeek the Image Based Search Engine", NetDaily.org, 2008.

* cited by examiner

*Primary Examiner* — Phong Nguyen
(74) *Attorney, Agent, or Firm* — Haynes and Boone, LLP

(57) ABSTRACT

Performing a user initiated search query is disclosed and comprises receiving user input comprising description details of at least one desired object, retrieving a plurality of objects from a database sharing one or more of the description details of the user input, constructing a tree data structure based on the description details of the plurality of objects, the tree data structure comprising one or more attributes related to each of the plurality of objects retrieved, displaying visual images associated with the retrieved plurality of objects, the visual images matching at least one of the attributes related to the plurality of objects, and receiving a user selection of one or more of the visual images.

17 Claims, 13 Drawing Sheets

Results for "knife" (585)

Related terms: pocket knife knives gerber leatherman henckels
See All Matching Products (458) | See All Matching Movies, Music, Books (127)

MATCHING PAGES
Shop All Cutlery ›

458 Product Matches   See All Product Matches ›

Miracle Blade 11-pc. Knife Set
★★★★☆ (23)

$19.99
as seen on tv

[+ Add to Cart]

Victorinox 8" Chef's Knife - Black
★★★★★ (4)

$29.99
Colors: Blk

[+ Add to Cart]

Results for "kitchen knifes" (277)

Related terms: knifes

See All Matching Products (272) | See All Matching Movies, Music, Books (5)

272 Product Matches   See All Product Matches ›

Victorinox 8" Chef's Knife - Black
★★★★★ (3)

$29.99
Item Ships Free With
Qualifying $50 Order

Colors: Blk

+ Add to Cart

Quick Info

Kitchen Aid Set of 2 Santoku Knives with Sheaths
★★★★★ (1)

$20.79
Item Ships Free With
Qualifying $50 Order

+ Add to Cart

Find it at a Target store

FIG. 1B

| Item_ID | | | | | |
|---|---|---|---|---|---|
| 016742 | | | | | |
| 016754 | | | | | |
| … | | | | | |

FIG. 5A

| Item_ID | | | | |
|---|---|---|---|---|
| 0342 | | | | |
| 0346 | | | | |
| … | | | | |

FIG. 5B

| Knife Item ID | Blade Item_ID |
|---|---|
| 016742 | 0342 |
| 016754 | 0342 |
| … | |

FIG. 5C

ATTRIBUTE CATEGORY ENHANCED SEARCH

CROSS-REFERENCE TO RELATED APPLICATIONS

This application claims the benefit of U.S. Provisional Patent Application No. 61/359,043, filed on Jun. 28, 2010. The subject matter of the earlier filed application is hereby incorporated by reference in its entirety.

FIELD OF THE INVENTION

To illustrate motivation for the invention let us consider a search process of a consumer product in online store. For example, we want to find a certain knife in online store of one of the major retailer such as Target. If we do not have precise or sufficient description of the knife we are looking for, the online search engine will return hundreds of items matching word "knife" (see FIG. 1A) and leave us with no option but to scroll through description of all of these objects one by one through many pages. While this example is very specific it is not unique. Whatever information was entered by the user (e.g., us) into the search system, most likely we have not entered all the information we have about the knife we are looking for. Often it happens because we simply do not know how to describe what we know about the object, e.g., its shape, certain design style, combination of color, etc. Most of the time, even if we could, the system does not provide means for us to enter all that information, simply because designing a universal user interface is impossible. Thus there is a need for a system and method that utilizes somehow the additional information that has not been provided to the system.

The present invention describes a system, method and computer readable storage medium comprising instructions for searching an object. The search process in the invented system takes advantage of images or short descriptions associated with sets of objects, where the said sets of objects are constructed based on their attribute values. Specifically, this invention describes a simple and quick method for building a category tree for the objects among which the desired object is being searched. The invention is applicable to search of any items, and is illustrated with an example of various applications from the consumer product searches. The disclosed embodiments relate generally to electronic devices with one or more physical nodes, and more particularly, to search systems and methods.

BACKGROUND

Searching is a popular topic in the computing world. With users wanting and demanding faster application, increase in information processing speeds, more memory, and smarter computers, searching and a system's ability to return accurate results very quickly is viewed as an important aspect of the computer experience. Some of the recent patents try to address this problem. For example, in the U.S. Pat. No. 7,664,739 "Object search ui and dragging object results" an object navigation system, user interface, and method that facilitate faster and smoother navigation of objects are provided. The invented, the system can generate a plurality of objects that can be rendered on a display space that spans a single page in length, thereby mitigating the need to navigate through multiple pages. The objects can also be viewed in a film strip format that is infinitely scrollable. While such techniques undoubtedly make search process more convenient compared to page-by-page navigation through search results, they fail to address the crucial requirement of fast search speed. Another shortcoming of the above mentioned patent is the lack of ability of the invented system to automatically reduced search space based on digital representation of information provided by the user about the object the user wants to find.

Digital image based search was also addressed in the industry. For example, in the U.S. Pat. No. 7,565,139 "Image based search engine for mobile phone with cameras", the inventors improve user's search experience by allowing him to take a digital photograph of an object, match it with an item in the remote database and provide full information about the object to the user. Key ideas facilitating the search process include doing the initial search on the mobile phone, so that database access overhead is minimized, and sending low resolution image to the server, so that less bandwidth is needed thus improving the response time of the application. Unfortunately this and other search related intentioned we examined do not provide an effective solution in case when exact image or description of the desired object is not available. Conventional search systems display or present search results in the form of a column or list to the user (e.g., see FIG. 1A). This format can be problematic from the user experience point of view for several reasons. The list may span many (sometimes hundreds) pages. Therefore the process of examining search results quickly becomes cumbersome and time-consuming. The user examining search results page by page gets tired and may skip important information. Thus only the item located on the top of the list will get full attention of the user.

A typical example of search results for a consumer product on the internet is shown in FIG. 1A. For illustration purposes we use online product search tool of one of the major retail stores TRAGET. Search for a word "knife" on www.target-.com returns a list of 585 items. The search can be refined by specifying more precisely the desired object, e.g. by entering "kitchen knife", etc. The result however is still a rather long list of "matching objects". As is seen in FIG. 1B, the user would have to examine upto 277 "kitchen knifes". This situation is not uncommon for other other widely available products such consumer electronics, a piece of furniture, bicylce, more recently even solar screen, etc. Therefore, a more efficient system and method is needed that can guide the consumer through the search process, that matches his visual expectation and leads quickly to the right object.

Thus, in this invention we address the problem of improving the effectiveness of finding a roughly described object in a large set of similar object. We illustrate the invention using example of search for a knife. It will be obvious from the description presented later in this disclosure that the system and method are applicable for search of any object.

SUMMARY

The following presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

Main idea of the invention is based on enhancing search process by splitting all available objects (after some preselection) into categories and walking the user through the tree constructed from these categories and using shapes/images corresponding to groups of objects in the search domain.

The subject application relates to a system(s) and/or methodology that facilitate viewing and refining search results. In particular, the application involves an improved data representation, improved search method and enhanced navigation method that when taken together, provide a smoother and more efficient search experience for a user. Contrary to traditional user interface and navigation means, the results are not paginated across multiple pages. Rather, they are essentially maintained on a single page, whereby the length of the page can depend in part on the number of objects attributes grouped in categories (defined later). Thus, attribute categories can be scrolled through all at once mitigating the need to page over and over again to see more results. In some cases the invented method may require user scrolling through more than one page along the attribute category tree (defined later). In such cases a legend will be provided helping the user to navigate easily through the available steps in the search process. As will be seen from the detailed explanation below, the system and method improve user experience by reducing the complexity of otherwise lengthy search process.

Solution presented in this invention disclosure consists of a system that takes initial input describing the desired object (e.g., consumer product) form the user. Then the system retrieves all the objects (e.g., products) matching the entered search criteria, constructs a tree structure based on objects' detailed description, and guides the user through that tree so that the user finds the desired product in a much fewer steps than going through the original long list. Construction of the tree structure and walking through the tree is facilitated by the auxiliary images matching categories related to the objects, whenever it is possible. By visually matching each category with the associated picture, the user can quickly determine the right category of objects, thus narrowing the search space and finding the desired object quickly.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 1B is a snapshot from www.target.com online search results for "kitchen knifes";

FIG. 5A depicts a table describing basic knife objects, in accordance with the present invention;

FIG. 5B depicts a table describing blade shape objects, in accordance with the present invention;

FIG. 5C depicts a table assigning relation between objects of tables shown in FIG. 5A and FIG. 5B, in accordance with the present invention;

Figure 1A:
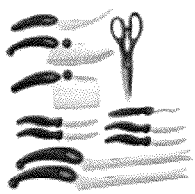
FIG. 1A is a snapshot from www.target.com online search results for "knifes"
Figure 1A:

The foregoing summary, as well as the following detailed description of certain embodiments of the present invention, will be better understood when read in conjunction with the appended drawings. The figures illustrate diagrams of the functional blocks of various embodiments. The functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk, or the like). Similarly, the programs may be stand alone programs, may be incorporated as subroutines in an operating system, may be functions in an installed imaging software package, and the like. It should be understood that the various embodiments are not limited to the arrangements and instrumentality shown in the drawings.

DETAILED DESCRIPTION OF THE INVENTION

Figure 2:
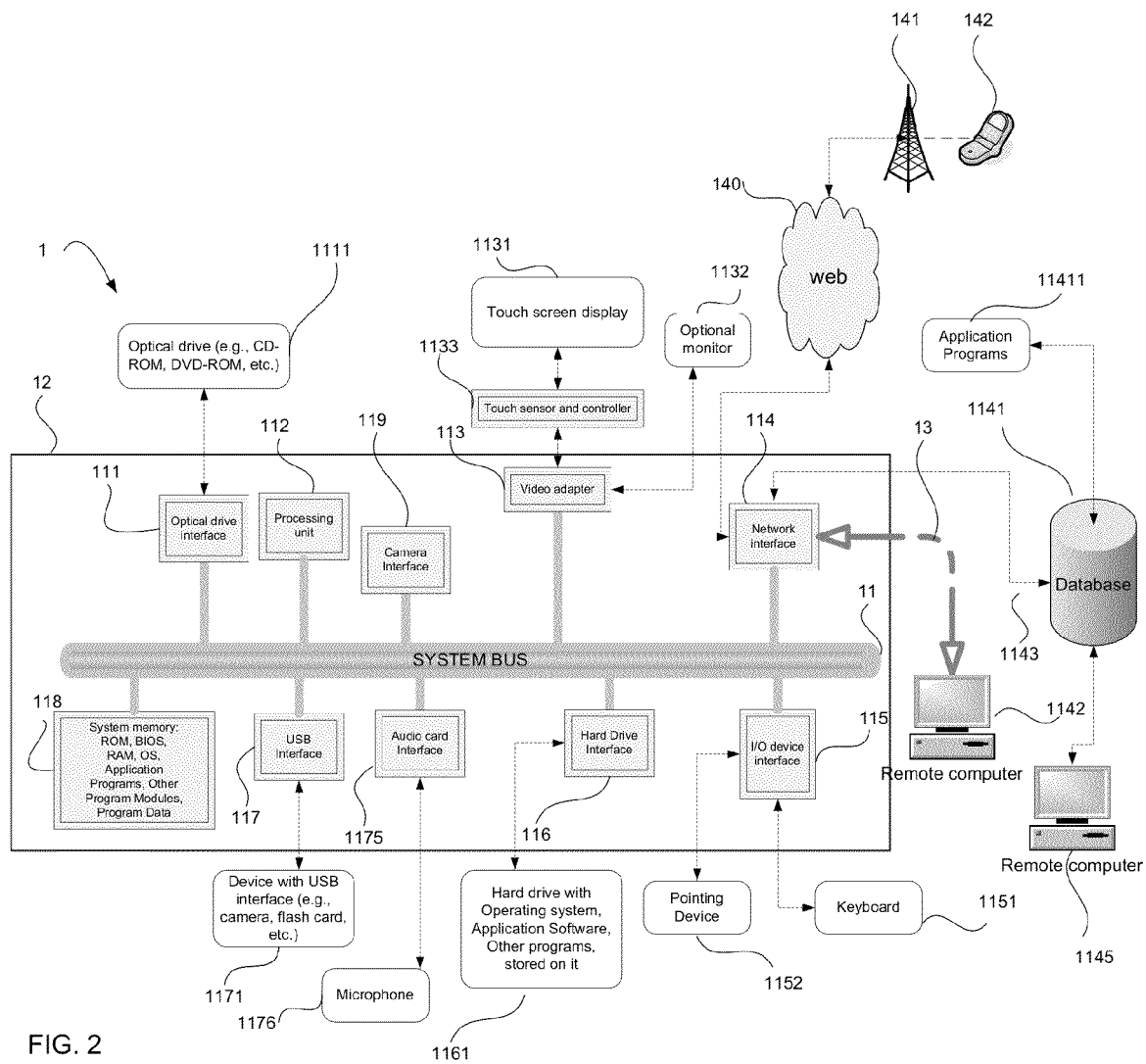
FIG. 2 illustrates a functional block diagram of a generally conventional computing device or personal computer that is suitable for analysis of data records in connection with the interactive display table, in accordance with the present invention.

Aspects of the present invention can be used in connection with a computing device including a touch screen. With reference to FIG. 2, an exemplary system 1 suitable for implementing various portions of the present invention is shown. The system includes a general purpose computing device in the form of a conventional computer (PC) 12, provided with a processing unit 112, a system memory 118, and a system bus 11. The system bus couples various system components including the system memory to processing unit 112 and may be any of several types of bus structures, including a memory bus or memory controller, a peripheral bus, and a local bus using any of a variety of bus architectures. The system memory includes read only memory (ROM) and random access memory (RAM). A basic input/output system (BIOS), containing the basic routines that help to transfer information between elements within the PC 12, such as during start up, is stored in ROM. The PC 12 further includes a hard disk drive 1161 for reading from and writing to a hard disk (not shown), an optical disk drive 1111 for reading from or writing to a removable optical disk, such as a compact disk-read only memory (CD-ROM) or other optical media. Hard disk drive 1161 and optical disk drive 1111 are connected to system bus 11 by a hard disk drive interface 116 and an optical disk drive interface 111, respectively. The drives and their associated computer readable media provide nonvolatile storage of computer readable machine instructions, data structures, program modules, and other data for PC 12. Although the exemplary environment described herein employs a hard disk and removable optical disk, it will be appreciated by those skilled in the art that other types of computer readable media, which can store data and machine instructions that are accessible by a computer, such as magnetic disks, magnetic cassettes, flash memory cards, digital video disks (DVDs), Bernoulli cartridges, RAMs, ROMs, and the like, may also be used in the exemplary operating environment.

A number of program modules may be stored on the hard disk, optical disk, ROM, or RAM, including an operating system, one or more application programs, other program modules, and program data. A user may enter commands and information via the PC 12 and provide control input through input devices, such as a keyboard 1151 or a pointing device 1152. Pointing device 1152 may include a mouse, stylus, wireless remote control, or other pointer, but in connection with the present invention, such conventional pointing devices may be omitted, since the user can employ the touch sensitive interactive display for input and control. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 112 through an I/O interface 115 that is coupled to the system bus 11. The term I/O interface is intended to encompass each interface specifically used for a serial port, a parallel port, a game port, a keyboard port, and/or a universal serial bus (USB).

System bus 11 is also connected to a camera interface 119. The digital video camera may be instead coupled to an appropriate serial I/O port, such as to a USB port. A monitor 1132 can be connected to system bus 11 via an appropriate interface, such as a video adapter 113. The system also has a touch screen display 1131 which can provide richer experience for the user and interact with the user for input of information and control of software applications. The touch screen display 1131 is communicatively coupled to a touch sensor and controller 1133. Touch sensor and controller can be combined in one block 1131 or they can be separate communicatively coupled blocks. It should be noted that the touch screen display 1131 and the touch screen sensor and controller 1133 can be enclosed into a single device as well. User interface can be implemented through the optional monitor 1132 coupled with the touch sensor and controller 1133 though the video adapter 113 or directly via internet, wireless, or another connection. It will be appreciated that PCs are often coupled to other peripheral output devices (not shown), such as speakers (through a sound card or other audio interface—not shown) and printers.

The present invention may be practiced on a single machine, although PC 12 can also operate in a networked environment using logical connections to one or more remote computers, such as a remote computer 1142. Remote computer 1142 may be another PC, a server (which can be configured much like PC 12), a router, a network PC, a peer device, or a satellite or other common network node, and typically includes many or all of the elements described above in connection with PC 12. The logical connection 13 depicted in FIG. 1B can be a local area network (LAN) or a wide area network (WAN). Such networking environments are common in offices, enterprise wide computer networks, intranets, and the Internet.

When used in a LAN networking environment, PC 12 is connected to a LAN through a network interface or adapter 114. When used in a WAN networking environment, PC 12 typically includes a modem (not shown), or other means such as a cable modem, Digital Subscriber Line (DSL) interface, or an Integrated Service Digital Network (ISDN) interface for establishing communications over WAN, such as the Internet. The modem, which may be internal or external, is connected to the system bus 11 or coupled to the bus via I/O device interface 115, i.e., through a serial port. In a networked environment, program modules, or portions thereof, used by PC 12 may be stored in the remote memory storage device. It will be appreciated that the network connections shown are exemplary and other means of establishing a communications link between the computers may be used, such as wireless communication and wide band network links.

Figure 3A:
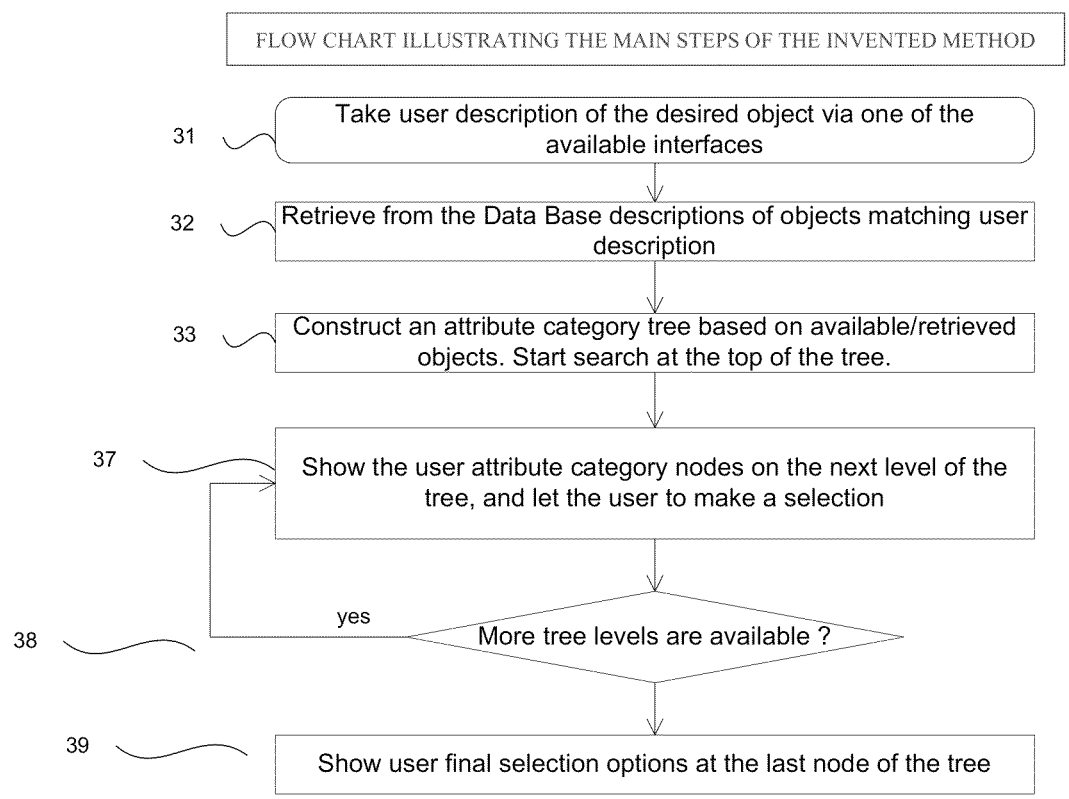
FIG. 3A is an example of a flow chart illustrating the main steps of the invented method.

Conventional search systems display or present search results in the form of a column or list to the user. Example of such output of search results is shown in FIG. 1B. The list may span many pages. Hence the process of examining search results becomes cumbersome and time-consuming. The user examining search results page by page gets tired and may skip important information. Thus only the item located on the top of the list will get full attention of the user. Clearly, this is not the best user experience, for someone who wants to find the desired product quickly. This invention provides a smarter search solution, which takes however minimum information the user may have about the object he is trying to find, and guides him quickly to the searched object. The main steps of the invented method are illustrated in FIG. 3A below. Each of the steps shown in FIG. 3A is described in detail in the following paragraphs.

Step 31: The system 1 takes the initial input describing the desired object (e.g., a consumer product such as knife) form the user via one or several user interfaces shown in FIG. 2. Methods of entering information about the desired object include but are not limited to text or audio description, digital image input as a file or as a reference to picture on the internet. For example, regular description of the object can be entered as text through the keyboard 1151 and displayed in monitors 1132 or 1131. The user may provide object description in the form of a picture taken by a digital camera or mobile phone and uploaded to the Processing unit 112 of the system through the camera interface 119 or USB interface 1171. Audio description of the desired product can also be entered through the microphone 1176 connected to the audio-card 1175 and processed by speech recognition system.

Figure 3B:
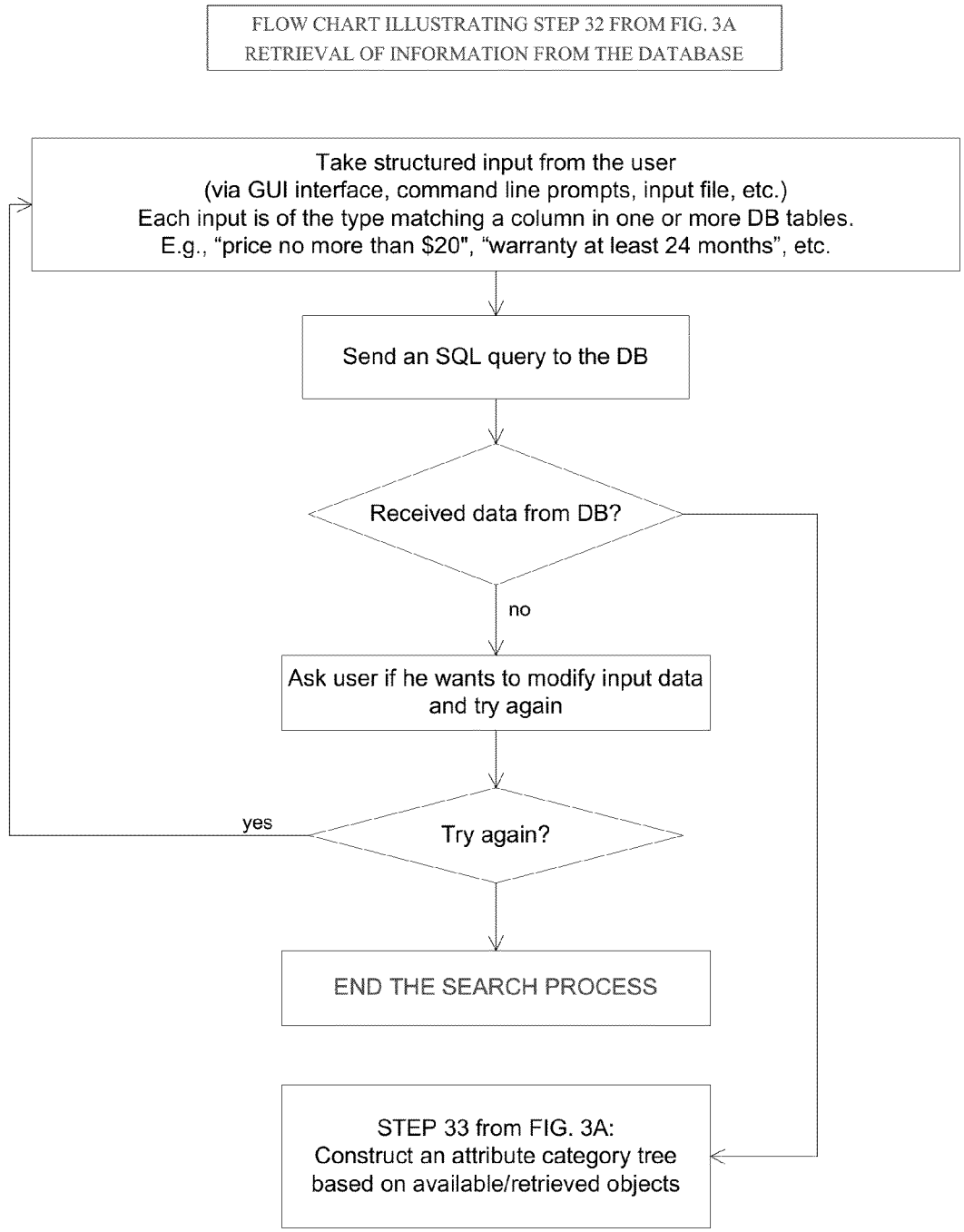
FIG. 3B is an example of a flow chart illustrating STEP 32 from FIG. 3A (retrieval of information from the database), in accordance with the present invention.

Step 32: Some information entered by the user (e.g., price range, warranty period, manufacturer, etc.) will be of the same type as columns in one or more the database tables, and could, therefore, be usable for constructing an SQL query. We will refer to such information as structured. However some information may not be easily translated into a structured query, but yet can be used by the user to navigate through the search process and find the desired product quickly. This will be illustrated below. Based on the structured input, software running on processor 112 of the system 1 will form a query to the database 1141 and retrieves information about all the objects (products) matching the entered search criteria. Original data can be stored in the database 1141 in various formats as explained in more detail in Appendix I below. A flow chart illustrating this procedure is shown in FIG. 3B. If no information matching the entered the criterion is returned, the system will prompt the user to change the entries in the input or reduced the entered information. Connection of the database 1141 can be implemented via communication link 1143, which includes but is not limited to a wire-line connection (such as Ethernet), a wireless connection (Bluetooth, WiFi, etc.), or any other connection supporting information exchange between computing devices, and via the corresponding network interface 114. Let's assume that based on the structured information the system is able to retrieve n objects described by m attributes.

In alternative embodiment of the invention, step 32 is omitted. In that case all information entered by the user is sent to the remote computer 1145 co-located with the database 1141. Therefore without loss of generality in the continued description of the invention we can assume that all the information is non-structured. The idea behind the usage of non-structured information is to present the user with several (but limited) choices at each step, and proceed with the selection process for nodes of the category tree (see Step 33 below) according to user's understanding of the right selection done in each step by the user.

Figure 3C:
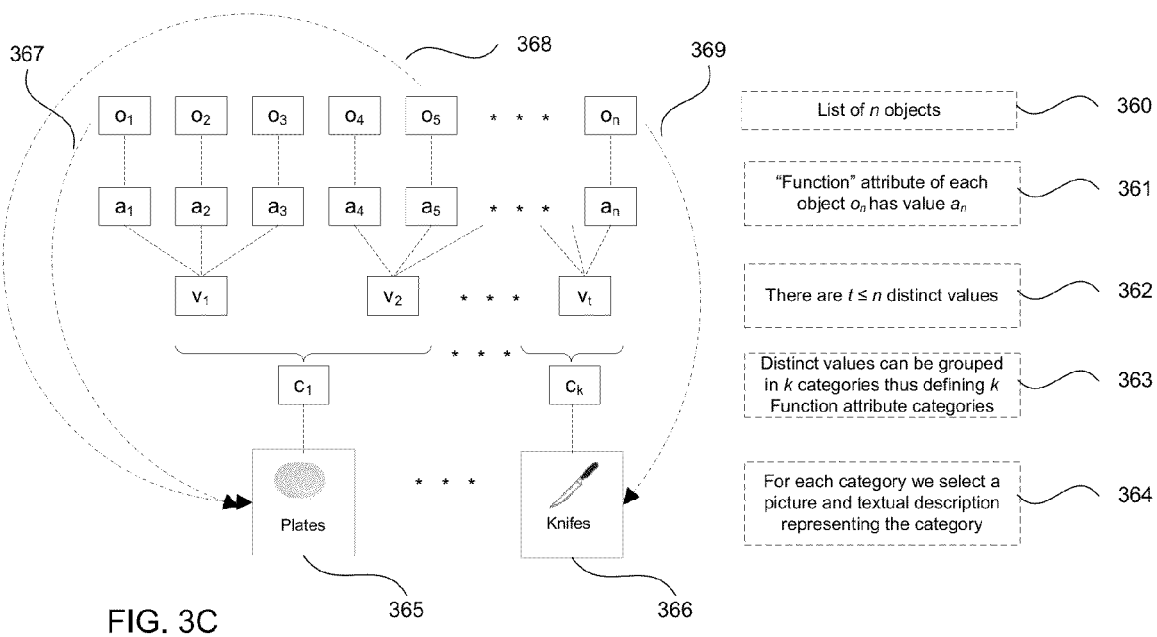
FIG. 3C is a schematic illustration of attribute category construction using predefined images and textual description, in accordance with the present invention.

Step 33: In this step the system constructs a tree based on attributes of available objects with the minimum level of nodes needed to complete the search process in pre-defined number of interactive search steps (described below) s. The first step is to divide all available objects into categories according to the values of each attribute. Schematic illustration of this step is provided in FIG. 3C.

Figure 3D:
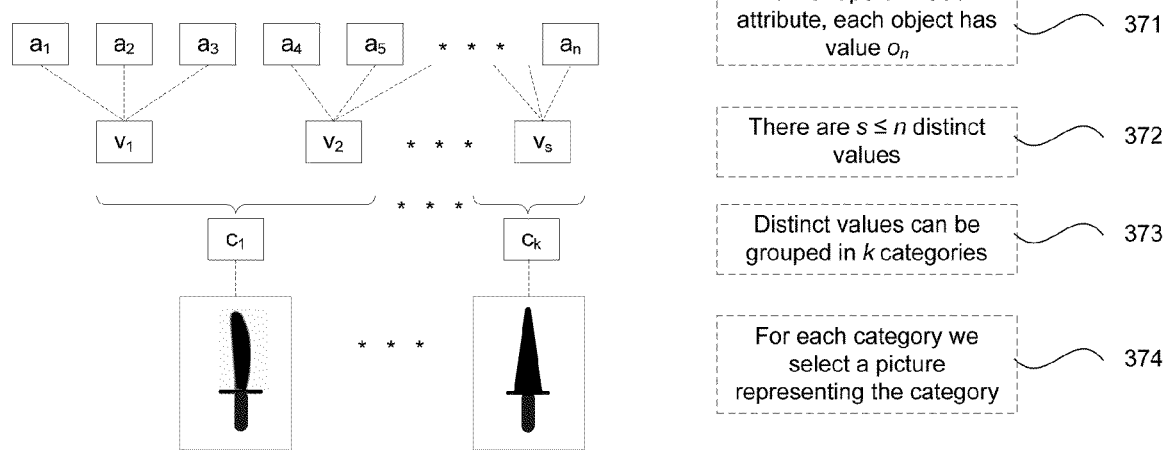
FIG. 3D is a schematic illustration of attribute category construction using only predefined images, in accordance with the present invention.

Let n and m denote the number of objects and number of attributes describing each object, respectively. Assume an attribute A (e.g., attribute "Function" as shown in step 361 of FIG. 3C) has t ($1 \le t \le m$) distinct values (step 362). If k is the number of choices we want to be given to the user at each step of interactive search, then we can split the number of objects into k categories according to the values of the attribute A (step 363). Each category must have a unique graphical depiction and/or text indicating to the user the range of values of the attribute in that category. For example, in step 364 of FIG. 3C, consumer products were divided according to their function into several categories, one of which was depicted as a "set of plates" with textual description "plates" (365), and another depicted as a "knife" and described "knifes" (366). In another example shown in FIG. 3D, a similar procedure is repeated for an attribute "shape of blade" applicable to objects in "knifes" category. As is seen in step 374 in this case we select only graphical depiction of each category.

The process of dividing object into k categories depends on the nature of the attribute A, and can be done either at the time when information about an object is entered in a database or sometimes automatically, e.g., when attribute has a numerical value, as will be illustrated later. In the example shown in FIG. 3C (as well as in FIG. 3D), the former method was used, and each object was linked to the pre-selected depiction and textual description as is illustrated by pointed arrows 367, 368, and 369.

Figure 3E:
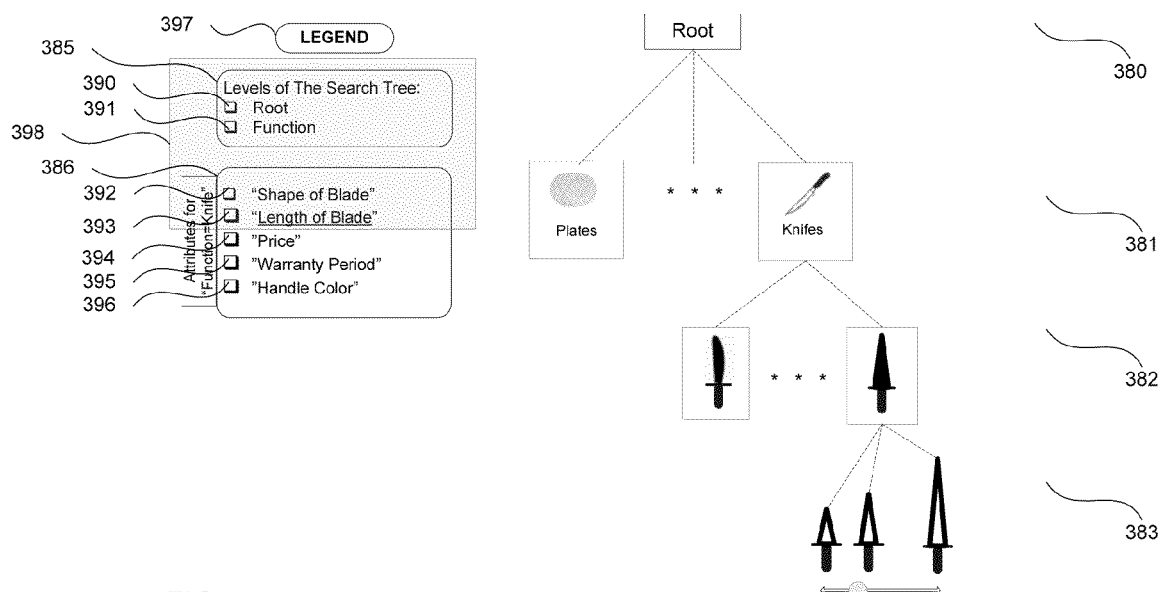
FIG. 3E is an illustration of (part of) attribute category tree and the search tree legend, in accordance with the present invention.

We use attribute categories described above to construct a tree. Each level of the tree is represented by attribute groups of corresponding to one attribute. As is shown in FIG. 3E, from the root 380 on the top we may start with "Function" attributes groups 381, followed by "shape of blade" attribute related nodes 382 under "knifes" node, followed by "length of blade" (please see definition of this attribute below) related nodes 383, etc. Notice that step 381 is equivalent to retrieving all object using a single search word "knife", as it was done in the initial example illustrated in FIG. 1A. Of course, we do not see now description of individual objects. Instead we can select attribute categories most closely describing the knife we are looking for. If we assume that each attribute category has the same number of objects linked to it, then at each selection step, the number of available object in the search space will reduced by a factor of k. Please note that this assumption is natural for attributes with numerical values, since we can easily select numerical values appropriately. For example, after step 382 in FIG. 3E, the system can re-balance the remaining knifes with the selected shape into k sets of equal size as follows. Order the knifes with the selected shape by "length of blade" values and split them into k sets roughly the same size by putting k knifes with the shortest blades into the first category, put knifes with the next k shortest blades into the second category, etc. For the attributes without numerical values, such re-balancing is not possible, unless there is finer category division (e.g., one could have 10*k different shapes instead on k). Then smaller categories can be re-grouped in order to keep the category size more or less equal. Such process would require additional pre-configuration which may not be justified for many products due to unnecessary complexity. It would suffice to place such categories on top of the category tree as is shown in FIG. 3E above. Moreover, in the worst case all the objects would fall into a single category and other categories would be empty. In such case the user would either select the non-empty category which is equivalent to skipping one level of tree, or end the search by selecting an empty category. Hence, in the illustrated worst case we may have to add one extra level of the tree. This is possible whenever $m > \log_k n$ (please see the next paragraph).

Therefore, if attribute values are distributed uniformly, it would take on the average $\log_k n$ steps (i.e., levels of the tree) to complete the search. If the number of attributes m is higher than $\log_k n$, we have freedom to select the most suitable attributes for the tree construction. Suitable here means, attributes for which category division is straight forward and unambiguous, e.g., clearly distinctive images can be used for each category, and/or the attribute has numerical values, etc. Once the tree is constructed, the search can be made very fast. Specifically if there are n objects, and k is the number of distinct groups for each attribute, the estimated number of step s for search completion is $\lceil \log_k n \rceil$. For example, if we allow 4 distinct attribute groups for each attribute, the maximum number s of search steps for a set of 585 objects (as in FIG. 1A) is 5.

In case when the number of the tree levels (attribute category levels) can not fit on a single page, the system will provide a legend of attribute categories for the objects selected in step 381. The purpose of this function is to allow the user to view all search tree levels at once, to go directly to the desired attribute category, and go back along the tree and try another branch, if necessary. For example, going back to FIG. 3E we see the legend 397 of all the levels of the search tree. Two level shown in window 385 are "Root" 390 and "Function" 391. These levels are on top of the tree, and selecting a specific function is equivalent to running a single word search query such as "Knife". As was illustrated earlier in FIG. 1A, such search could result in 585 matching objects. The system will construct attribute based category tree corresponding to all knifes. As was illustrated above, if each level of the tree has 4 nodes with evenly distributed objects among them, the user would have to make selections in 5 levels of the tree in order to complete the search. For example, these five levels could be "Shape of Blade" 392, "Length of Blade" 393, "Price" 394, "Warranty Period" 396, and "Handle Color" 397. These five attributes are shown as part of the legend in window 386. Since all of the levels of the tree may not fit on one page, as is shown in FIG. 3E, the user can use the legend to see all of them and to navigate through the levels of the tree. All levels that can be examined on the right hand side of the current page are highlighted in window 398. The is always an active level—the level at which the user is expected to make next selection. Active level is underscored in the legend. For example, in FIG. 3E the active level is "Length of Blade" 393.

Figure 4:
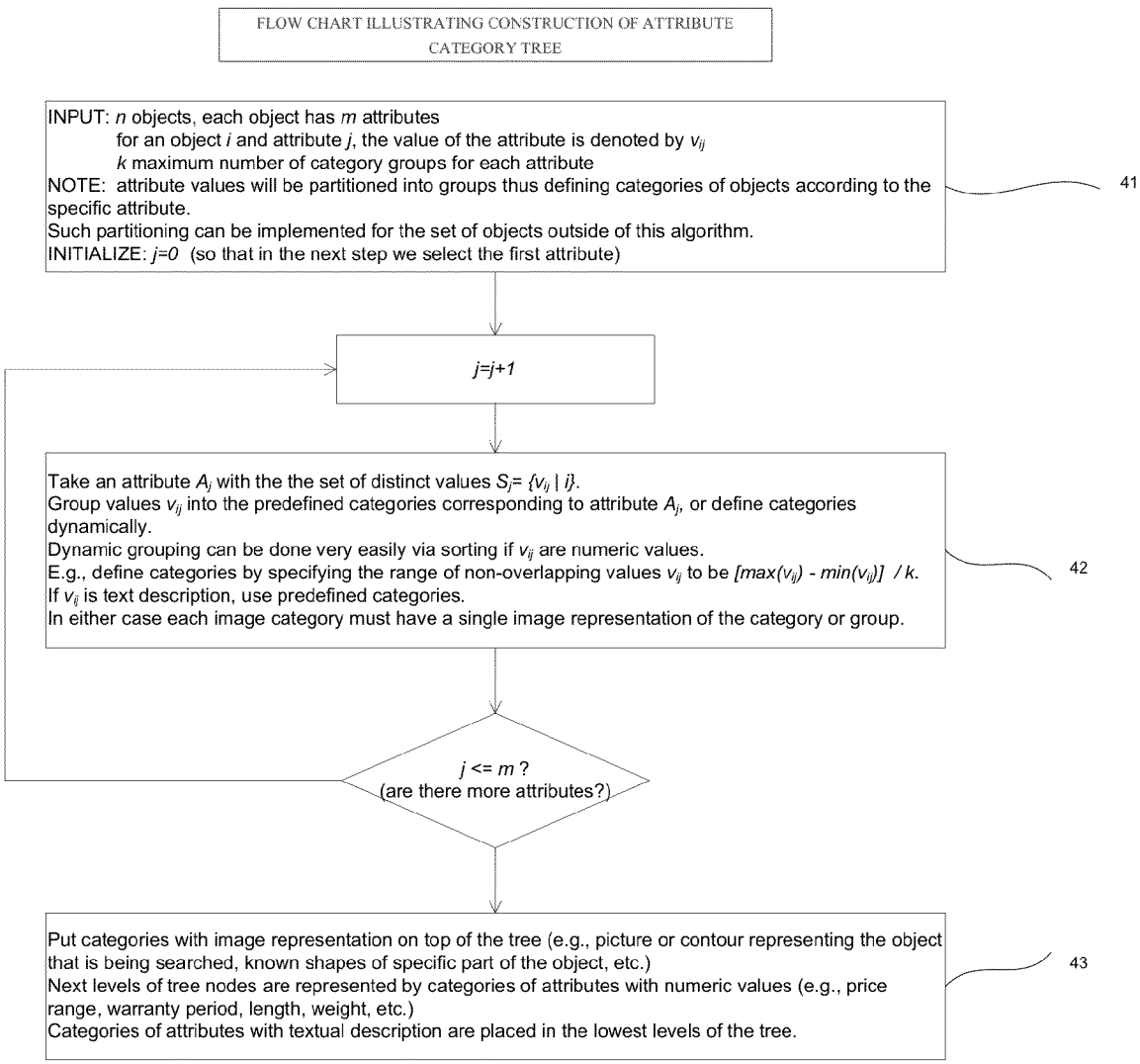
FIG. 4 is an example of a flow chart illustrating attribute category tree construction in accordance with an embodiment of the present invention.
Figures 6A, 6B, 6C, 6D:
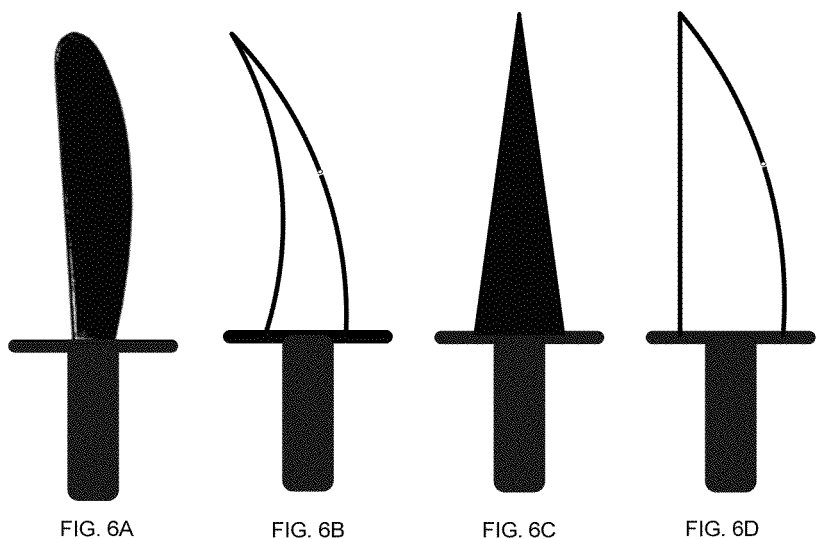
FIG. 6A-FIG. 6D examples of images representing shape categories.

The generic attribute category based tree construction method is illustrated by a flow chart in FIG. 4 in three main steps. Step 41 describes input to the tree construction algorithm. These are number n of objects, each object is described by m attributes as described earlier as well as in Appendix I. We also assume that we are given maximum number k of categories for each attribute (see previous paragraph). Step 42 describes category construction for each type of attributes. Non-numeric attributes such product images are mapped to one of the image categories by default. Each such category has an image representing it. For a numerical attribute j (e.g., price) we can identify range of the attribute values (in this case that would minimum and maximum price). The price range is split into k intervals each containing equal number of distinct price values. Then each price interval defines price category. It is obvious that user presented a choice of price category will be able to select the one which will guarantee that the number of choices does not exceed |S|/k, where |S| is the number of distinct price values. Step 42 is repeated for all m attributes. For example, later we illustrate "length of knife blade" as another category set. Finally in step 43, tree nodes for which graphical depiction is available in the user input, are being placed on the top of the tree. Next levels of tree nodes are represented by categories of attributes with numeric values (e.g., price range, warranty period, length, weight, etc.) Categories of attributes with textual description are placed in the lowest levels of the tree. These attribute values are not easy to categorize and almost always the corresponding categories will be predefined. For example consider such attribute of a product as "manufacturer". Most likely the user either will know exactly what value of such attribute he is looking for, in which case the selection is very simple, or he does not know, and at the end of the search process we will be left with a very few products to choose from, so that selection process can be completed quickly.

As stated earlier the purpose of the algorithm is to facilitate object search by the user, who has some (perhaps very limited) non-structured information about the object which has not been used yet. Each attribute A[j]], 1≤j≤m, can take N[j] different values. We can assume that no two objects have the same attribute values. Therefore, n could be at most N[1]·N[2] . . . N[m]. Examples of attributes for a product such as knife can be described A[1]="shape of the blade"; A[2]="length of blade"; A[3]="quality of the material (e.g. steel that the blade is made of)"; A[4]="handle color", A[5]="warranty period", A[6]="price" etc. Some attributes, such as "price", "warranty period", etc., have numeric values, others can be represented by images, e.g., "shape of the blade". If the number of choices k at each step is predefined, for each attribute the set of distinct values is divided into k groups. For example, if k=4, then shapes of blades will be split into four categories. The system uses image representation of each object whenever possible. Each object in the database has a photo, and therefore all available photos can be grouped in categories. Example of such grouping is shown in FIG. 6A-D. We will refer to these images as shapes images of the corresponding categories shape-A, shape-B, shape-C, and shape-D. Whenever the user knows exact or approximate graphical depiction of the desired object (even if it has not been provided to the system by the user in Step 31 of FIG. 3A), the user can use his knowledge to select one of the category shapes (see Step 37, FIG. 3A). For example, the system will show shapes shown in FIG. 6A-6D, and ask the user to select one closely matching the product he is looking for.

If the user has difficulty selecting any one of depicted categories, the system will present the user with an option to select all, which is equivalent to skipping the current level of the tree. Therefore, it is possible that a user that skips sufficient number of selection levels will end up with more than one individual objects to select from. However such possibility does not reduce the benefits of the design system and method. It simply means that some users may not have sufficient information about the product they are looking for.

Figure 7A:
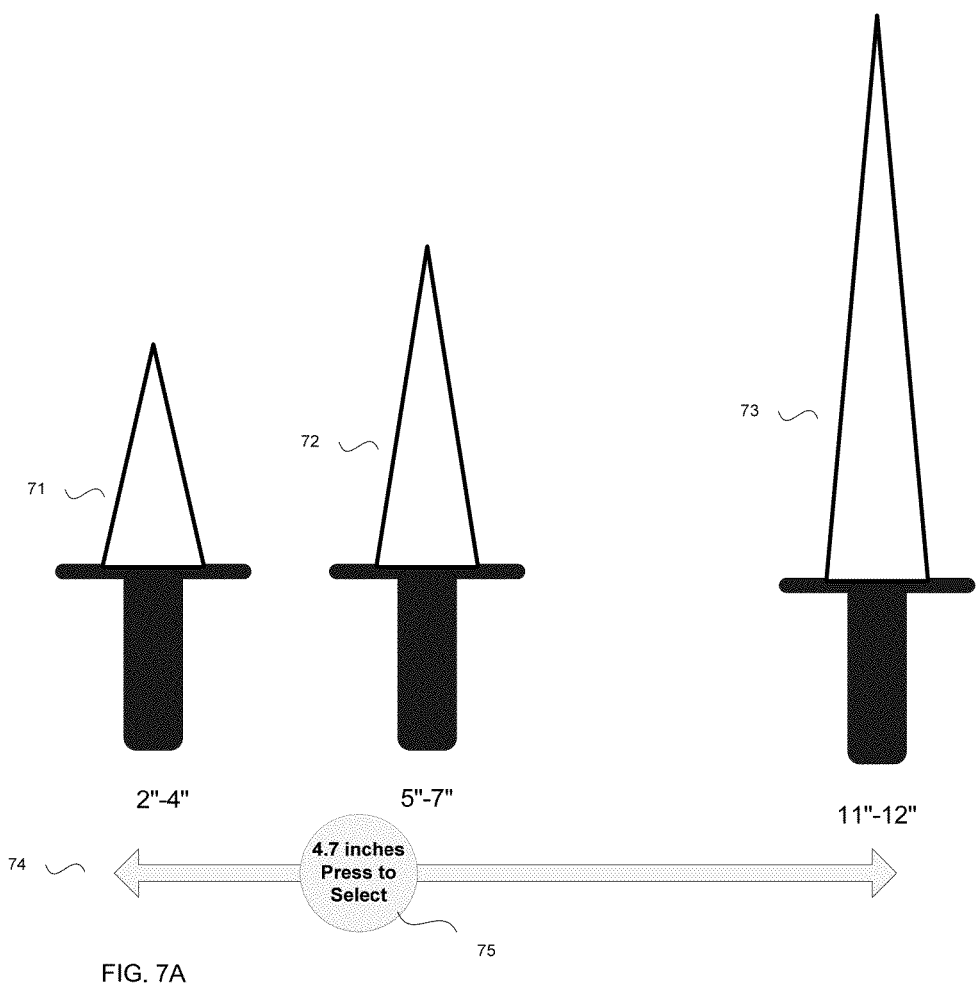
FIG. 7A-7B blade length selection graphical interface.

Steps 37: For illustration of this step, let us assume the system has determined with the help from the user that the shape of the knife the user wants is matching FIG. 6C, and the user has not specified length of the blade. In that case the system select the branch of the tree under selected shape option shown in FIG. 6C and expand the tree below that node (please see FIG. 3E). Thus the system will present the user with available blade length choices. (Here we assume that blade length is one of the attributes describing knifes. This particular attribute example is used for illustrative purposes only. It can be easily extended to any other numerical attribute.) By default the original tree must have k or less length categories. Assume that originally the length attribute was grouped into k=4 categories, but after the selection of shape-C (FIG. 6C) it was determined that knifes of particular shape are available only in three length-categories shown in FIG. 7A: 2"-4" length category depicted by icon 71, 5"-7" category shown as icon 72, and 11"-12" category shown by icon 73. The user can select one of these three categories by pressing in any of the category icons, or he can use the sliding bar 74 and select the exact length by touching the button 75 and sliding it along the sliding bar 74 until the desired length value appears inside the button 75. Then the user can select the knife with specified blade length by pressing the button 75. According to one embodiment these functions will be performed by the user using touch screen interface available through touch screen display 1131 and touch screen sensor and controller 1133 shown in FIG. 2. Alternatively, system can provide conventional graphical user interface where the user can slide and press button 75 using a pointing device 1152 such as mouse or touchpad device.

Figure 7B:
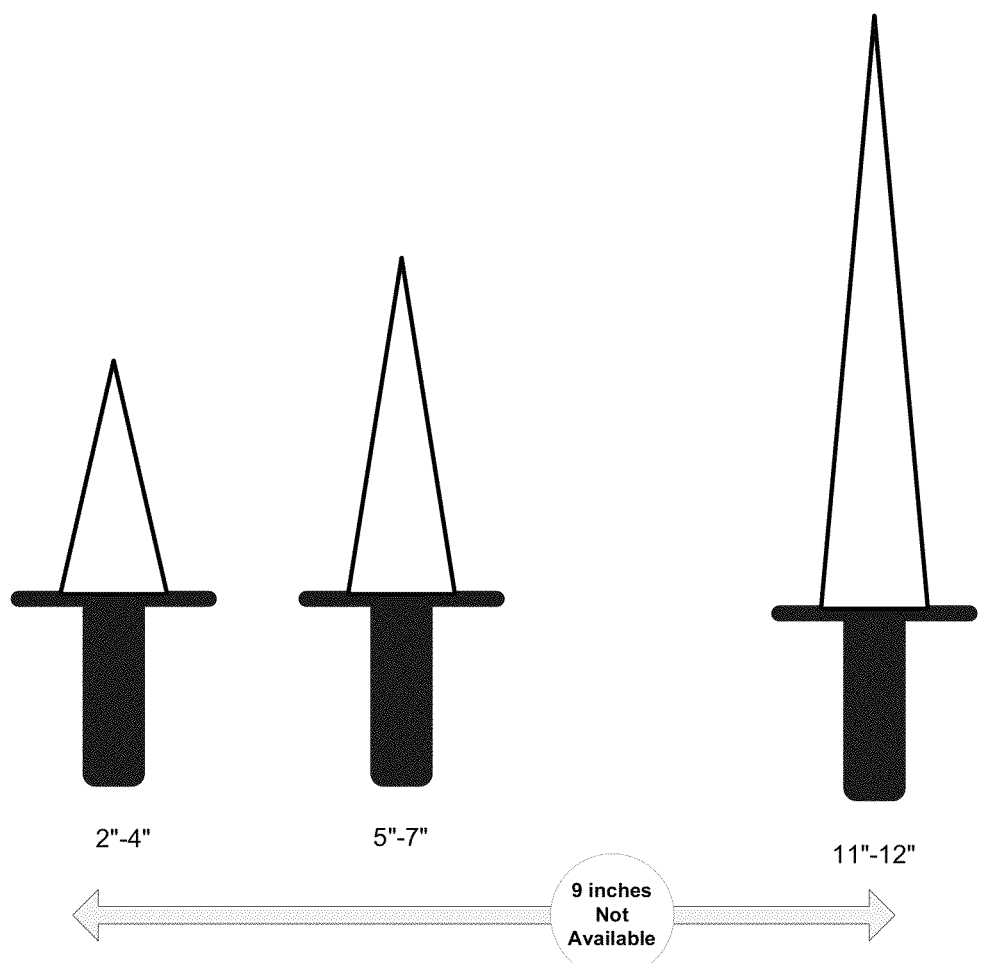

In one embodiment whenever a certain option is available the color of the sliding button 75 will be green. In cases when certain length options are not available, the color of the button will be clear or red, and/or the appropriate message will be displayed inside the button 75. For example in FIG. 7B, the unavailability of a knife of length 9" is shown. In another embodiment proper matching or availability of certain options will be communicated to the user via audio announcements. For example, the system may announce "You may select three blade length options". Or alternatively, the system may say "selected blade shape of length 9" is not available" if the user tries to select such option, etc.

Steps 38-39: Similar approach can be used for any numerical attribute such as price range, warranty period, etc. In other words, the user does not have to specify all these attributes. The system will automatically guide the user through the available options, thus quickly narrowing the search space. The process will continue until all levels of three are passed and the desired product is found.

The preferred way of storing product information in a database is by using a hierarchical structure such as used in XML-like format. However, it is not necessary for this invention. In fact data can be stored in a series of flat tables as is a common practice in relation databases. A table here refers to a two dimensional representation of data using columns and rows. Each column represents an attribute, and each row is a tuple representing an object and information about that object. For example, knifes can be described in two or more basic tables describing knife and blade shape objects shown in FIG. 5A and FIG. 5B, respectively. These tables are in turn linked by another table associating knifes with the corresponding blade objects.

There are at least two ways to map tree structure to data stored flat tables and back. One method, called the adjacency list model, is based on recursive procedure applied to the table (adjacency list) mapping each node in the tree to its parent.

This method is simple to implement, but due to recursive nature may take relatively long time to execute. The other method, called preorder tree traversal algorithm, is faster and is based on traversing the tree branch-by-branch from the left hand side (counterclockwise), and marking each node with the two step numbers corresponding to the steps on which the node is being visited. The latter method allows to assess quickly the number of descending nodes for each given node in the tree. If a node N has numbers l and r as left and right write markers, then the number of nodes below N is (r-l-1)/2.

We claim:

1. A method of performing a user initiated search query, the method comprising:
    receiving, at a computing device comprising at least one processor, user input comprising description details of at least one desired object;
    retrieving at the computing device a plurality of objects from a database sharing one or more of the description details of the user input;
    constructing a tree data structure based on the description details of the plurality of objects, the tree data structure comprising at least two levels and attributes related to each of the plurality of objects retrieved at each of the at least two levels, wherein each of the attributes is different;
    displaying, via a display of the computing device, visual images associated with the retrieved plurality of objects such that each of the plurality of objects is depicted by at least one corresponding unique visual image, the visual images matching at least one of the attributes related to the plurality of objects;
    displaying a first predetermined number of selection option choices at a first iteration of the search, wherein the first predetermined number of selection options comprise at least one first visual image and at least one first corresponding attribute at a first level of the tree;
    receiving at least one selection of one or more of the visual images;
    displaying a second predetermined number of selection option choices at a second iteration of the search, wherein the second predetermined number of selection options comprise at least one second visual image and at least one second corresponding attribute at a second level of the tree, and wherein the at least one second visual image and the at least one second corresponding attribute are different from those in the first level of the tree;
    determining whether additional visual images are associated with the tree data structure, the additional visual images not yet provided to the user;
    if so, displaying the additional visual images associated with the tree data structure to the user; and
    receiving a user selection of one or more of the additional visual images.

2. The method of claim 1, wherein the user initiated search query is performed via a user interface.

3. The method of claim 1, wherein the user input is at least one of text, audio and a digital image.

4. The method of claim 3, wherein the user input is a description of a desired product.

5. The method claim 1, further comprising:
    performing another search query to refine the search results based on the user selection of the one or more additional visual images; and
    providing the refined search results to the user.

6. The method of claim 1, further comprising:
    if none of the visual images are matching at least one of the attributes related to the plurality of objects, then prompting the user to perform at least one of change the user input comprising description details of at least one desired object and reduce the amount of entered information.

7. An apparatus configured to perform a user initiated search query, the apparatus comprising:
    a receiver configured to receive user input comprising description details of at least one desired object; and
    a processor configured to
    retrieve a plurality of objects from a database sharing one or more of the description details of the user input,
    construct a tree data structure based on the description details of the plurality of objects, the tree data structure comprising at least two levels and attributes related to each of the plurality of objects retrieved at each of the at least two levels, wherein each of the attributes is different, and
    display visual images associated with the retrieved plurality of objects such that each of the plurality of objects is depicted by at least one corresponding unique visual image, the visual images matching at least one of the attributes related to the plurality of objects,
    display a first predetermined number of selection option choices at a first iteration of the search, wherein the first predetermined number of selection options comprise at least one first visual image and at least one first corresponding attribute at a first level of the tree,
    receive a user selection of one or more of the visual images,
    display a second predetermined number of selection option choices at a second iteration of the search, wherein the second predetermined number of selection options comprise at least one second visual image and at least one second corresponding attribute at a second level of the tree, and wherein the at least one second visual image and the at least one second corresponding attribute are different from those in the first level of the tree,
    determine whether additional visual images are associated with the tree data structure, the additional visual images not yet provided to the user, and if so, to display the additional visual images associated with the tree data structure, and wherein the receiver is further configured to receive a user selection of one or more of the additional visual images.

8. The apparatus of claim 7, wherein the user initiated search query is performed via a user interface.

9. The apparatus of claim 7, wherein the user input is at least one of text, audio and a digital image.

10. The apparatus of claim 9, wherein the user input is a description of a desired product.

11. The apparatus of claim 7, wherein the processor is further configured to perform another search query to refine the search results based on the user selection of the one or more additional visual images, and provide the refined search results to the user.

12. The apparatus of claim 7, wherein if none of the visual images match at least one of the attributes related to the plurality of objects, then the processor is further configured to prompt the user to perform at least one of change the user input comprising description details of at least one desired object and reduce the amount of entered information.

13. A non-transitory computer readable medium configured to store instructions that when executed cause a processor to perform a user initiated search query, the processor being further configured to perform:

receiving at a computing device user input comprising description details of at least one desired object;

retrieving at the computing device a plurality of objects from a database sharing one or more of the description details of the user input;

constructing a tree data structure based on the description details of the plurality of objects, the tree data structure comprising at least two levels and attributes related to each of the plurality of objects retrieved at each of the at least two levels, wherein each of the attributes is different;

displaying, via a display of the computing device, visual images associated with the retrieved plurality of objects such that each of the plurality of objects is depicted by at least one corresponding unique visual image, the visual images matching at least one of the attributes related to the plurality of objects;

displaying a first predetermined number of selection option choices at a first iteration of the search, wherein the first predetermined number of selection options comprise at least one first visual image and at least one first corresponding attribute at a first level of the tree;

receiving at least one selection of one or more of the visual images;

displaying a second predetermined number of selection option choices at a second iteration of the search, wherein the second predetermined number of selection options comprise at least one second visual image and at least one second corresponding attribute at a second level of the tree, and wherein the at least one second visual image and the at least one second corresponding attribute are different from those in the first level of the tree;

determining whether additional visual images are associated with the tree data structure, the additional visual images not yet provided to the user;

if so, displaying the additional visual images associated with the tree data structure; and receiving a user selection of one or more of the additional visual images.

14. The non-transitory computer readable medium of claim 13, wherein the user initiated search query is performed via a user interface.

15. The non-transitory computer readable medium of claim 13, wherein the user input is at least one of text, audio and a digital image.

16. The non-transitory computer readable medium of claim 15, wherein the user input is a description of a desired product.

17. The non-transitory computer readable medium of claim 13, further comprising:

performing another search query to refine the search results based on the user selection of the one or more additional visual images; and providing the refined search results to the user.

* * * * *